United States Patent [19]

Nagashima

[11] Patent Number: 4,717,477
[45] Date of Patent: Jan. 5, 1988

[54] SWINGABLE FILTER

[75] Inventor: Akira Nagashima, Kawasaki, Japan

[73] Assignee: Kioritz Corporation, Tokyo, Japan

[21] Appl. No.: 888,450

[22] Filed: Jul. 21, 1986

[30] Foreign Application Priority Data

Aug. 9, 1985 [JP] Japan .......................... 60-122503[U]

[51] Int. Cl.⁴ ...................... B01D 35/28; B01D 35/02
[52] U.S. Cl. .................................. 210/314; 210/172;
210/413; 210/416.4; 210/460; 210/232
[58] Field of Search ............... 210/172, 314, 316, 317,
210/318, 353, 355, 416.1, 416.4, 416.5, 460, 463,
413, 232

[56] References Cited

U.S. PATENT DOCUMENTS

| | | | |
|---|---|---|---|
| 580,527 | 4/1897 | Martin | 210/413 |
| 1,414,137 | 4/1922 | Knock | 210/314 |
| 1,960,335 | 5/1934 | Finnie et al. | 210/460 |
| 1,967,785 | 7/1934 | Schacht | 210/463 |
| 4,428,835 | 1/1984 | Nagashima | 210/172 |
| 4,528,097 | 7/1985 | Ward | 210/353 |

FOREIGN PATENT DOCUMENTS

| | | | |
|---|---|---|---|
| 47-3430 | 1/1972 | Japan | 210/416.1 |
| 1503343 | 3/1978 | United Kingdom | 210/172 |

*Primary Examiner*—Richard V. Fisher
*Assistant Examiner*—Linda S. Evans
*Attorney, Agent, or Firm*—Browdy and Neimark

[57] ABSTRACT

A swingable filter including an upper lid for discharging a liquid therethrough which is connected to a flexible pipe of a liquid suction device, a weight, a plurality of ribs defining a space for housing and supporting the weight for rotating movement, a first filter element located on the outer periphery of the ribs and a second filter element interposed between the upper lid and the weight. The weight cleans the filter elements by its rotation. To secure the elements together, a detachable rubber band may be provided.

3 Claims, 3 Drawing Figures

SWINGABLE FILTER

BACKGROUND OF THE INVENTION

(1) Field of the Invention

This invention relates to a filter mounted at a free end of a suction pipe of a liquid suction device.

(2) Description of the Prior Art

A filter is mounted at the suction pipe of a fuel tank for an internal combustion engine or a lubricant tank for a small machine of a portable type to prevent the entry of dust or other foreign matter into the suction pipe. Proposals have been made to use elastic material to form such suction pipe to enable all the liquid in the tank to be drawn by the suction pipe regardless of the posture of the machine.

A filter having an elongated cylindrical form has usually been used and has suffered the disadvantages that the finish and the shape of its filter element do not lend themselves to easy treatment, resulting in the filter becoming high in cost in spite of its size being small. To obviate this problem, proposals have been made to use a swingable filter of spherical shape, as disclosed in Japanese Utility Model Examined Publication No. 42096/84 (corresponding to U.S. Pat. No. 4,428,835 too Nagashima), for example. This type of filter is simple in construction, low in cost and capable of cleaning itself by its swinging movement during operation. It is earnestly desired nowadays that further improvements be incorporated in the construction of the filter to provide improved filtering function.

SUMMARY OF THE INVENTION

(1) Object of the Invention

This invention has been developed for the purpose of obviating the aforesaid disadvantages of the prior art. Accordingly, the invention has as its object the provision of a swingable filter, simple in construction and high in filtering efficiency, which enables its filter element to be readily replaced by new ones while being able to prolong their service life.

(2) Statement of the Invention

The outstanding characteristics enabling the aforesaid object to be accomplished include an upper lid for discharging a liquid therethrough which is connected to a flexible suction pipe of a liquid suction device, a weight, a plurality of ribs defining a space for housing and supporting the weight therein, a first filter element located on an outer periphery of the ribs and a second filter element interposed between the upper lid and the weight.

In the filter provided with the aforesaid outstanding characteristics of the invention, filtering of a liquid is effected in two stages or the liquid is primarily filtered through the first filter element and then secondarily filtered through the second filter element, so that the performance of the filter is high. The filter is easy to assemble and disassemble, making it easy to replace the old component parts by new ones. It is simple in construction and low in cost. Its filter layers have a prolonged service life because filtering is effected in two stages. Since the filter moves in swinging movement in the tank, the rotating movement of the weight aids in increasing the efficiency of the self-cleaning function of the filter. Combined with the two-stage filtering action, this self-cleaning function contributes to improved filtering function of the filter according to the invention.

DESCRIPTION OF THE PREFERRED EMBODIMENT

Figure 1:
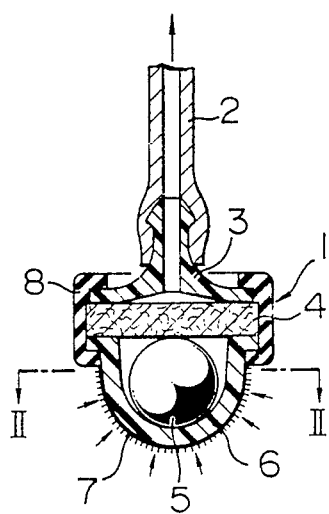
FIG. 1 is a vertical sectional view of the swingable filter comprising one embodiment of the invention.
Figure 2:
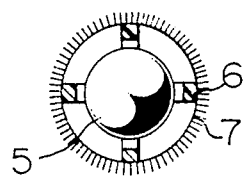
FIG. 2 is a sectional view taken along the line II—II in FIG. 1.

One embodiment of the invention will now be described by referring to the accompany drawings.

A swingable filter generally designated by the reference numeral 1 comprises an upper lid 3 for discharging a liquid therethrough which is formed of synthetic resinous material and disposed in an upper portion of the filter 1 and connected to a suction pipe 2 formed of elastic material, so that the filter 1 is maintained in communication with a liquid suction device, not shown, via the suction pipe 2. The filter 1 may be used for feeding gasoline from a fuel tank into a carburetor of an internal combustion engine.

Figure 3:
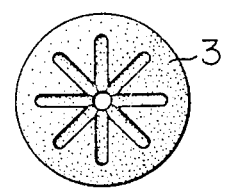
FIG. 3 is a bottom plan view of the upper lid for discharging a liquid therethrough in FIG. 1.

The filter 1 further comprises a second filter element 4 disposed directly below the upper lid 3 and its disc-shaped lower portion which defines a space. The upper lid 3 has a bottom surface configured as shown in FIG. 3 which contacts a top surface of the second filter element 4, to facilitate the flow of the liquid. The second filter element 4 is shaped like a disc and formed of strainer material such as felt. Disposed below the second filter element 4 is a weight 5 of spherical shape formed as of stainless steel. The weight 5 of this shape is supported for rotating movement in a space defined by a plurality of ribs 6 formed of synthetic resinous material. A first filter element 7 of substantially hemispherical shape which may be formed to provide a unitary structure with the ribs 6 by cooperating therewith is located on the outer periphery of the ribs 6 and its upper end portion is held between flanges at upper ends of the ribs 6 and the bottom surface of the second filter element 4, so that the first filter element 7 can be secured to the upper lid 3 together with the second filter element 4. A rubber band 8, shown in FIG. 1, may be used to positively secure the first filter element 7 to the upper lid 3. The rubber band 8 serves as a shock absorber to absorb any shock which the filter 1 might otherwise suffer when it impinges on an inner wall surface of a tank, not shown, thereby avoiding wear that might otherwise be caused on the inner wall surface of the tank and the filter 1. When the filter 1 is used with a machine in which the filter 1 shows almost no change in posture during operation, the rubber band 8 may be eliminated and the upper lid 3 may be formed with a skirt which may be secured at its lower end to the ribs 6 by crimping, force fitting, bonding or any other suitable means, so as to secure the first filter element 7 to the upper rid 3.

In the swingable filter 1 of the spherical type shown and described hereinabove, the ribs 6 are formed of synthetic resinous material and the first filter element 7 forms a unitary structure with the ribs 6. The invention is not limited to this form of first filter element 7, and a metallic net may be used to form the first filter element 7. The filter 1 according to the invention is made very light in weight. However, a metallic ball constituting the weight 5 is contained in the filter 1 to give a sufficiently heavy weight to the filter 1 to enable it to maintain a suitable posture.

In the swingable filter 1 of spherical shape according to the invention, the spherical weight 5 is supported by the ribs 6 in a central portion of the space defined thereby. This allows the filter 1 to readily follow up changes in the posture of the machine and increases the frequency with which the filter 1 is brought into contact with the inner wall surface of the tank by a swinging movement brought about by the momentum of the weight 5. This is effective to improved self-cleaning function of the filter, because the dust attached to the outer surfaces of the filter elements can be readily removed and the adhesion of dust to the filter elements can be positively avoided. The first and second filter elements 7 and 4 can achieve multiplied effects by performing filtering in two stages, and the spherical weight 5 has the effect of cleaning the filter elements 7 and 4 by its rotating movement. Thus, the filter 1 can achieve satisfactory results in performing filtering, and the filter 1 can be made to suit the condition of use by selecting suitable combinations of materials for the first and second filter elements 7 and 4. The filter elements 7 and 4 have a prolonged service life and can be readily replaces by new ones merely be detaching the rubber band. Thus the filter provided by the invention is light in weight, compact in size, simple in construction and low in cost and can have many applications.

What is claimed is:

1. A swingable filter comprising:

an upper lid for discharging a liquid therethrough, said upper lid being connected to a flexible suction pipe of a liquid suction device;

a rotatable weight;

a plurality of ribs defining a space for housing and supporting said weight therein for rotation of said weight upon said ribs;

a first filter element located on an outer periphery of the ribs; and a second filter element interposed between the upper lid and the weight, said weight simultaneously contacting said ribs and a lower surface of said second filter element for simultaneous rotation thereon, whereby said simultaneous rotation of said weight simultaneously cleans said first and second filter elements.

2. A swingable filter as claimed in claim 1, further comprising a rubber band for securing said upper lid, second filter element and ribs together to provide a unitary structure.

3. A swingable filter as claimed in claim 1, wherein said upper lid for discharging a liquid therethrough includes a connection formed at its upper portion for connecting the upper lid to the flexible suction pipe and a disc-shaped portion formed inside its lower portion to define a space, wherein said second filter element is disc-shaped and located beneath the upper lid, wherein said weight is spherical in shape and located beneath the second filter element, and wherein the space defined by said ribs is greater in size than the weight.

* * * * *